(12) United States Patent
Skinner et al.

(10) Patent No.: US 10,963,159 B2
(45) Date of Patent: Mar. 30, 2021

(54) VIRTUAL INTERFACE OFFSET

(71) Applicant: Lenovo (Singapore) Pte. Ltd., Singapore (SG)

(72) Inventors: Jeffrey E. Skinner, Raleigh, NC (US); Jonathan Jen-Wei Yu, Raleigh, NC (US); Aaron Michael Stewart, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 769 days.

(21) Appl. No.: 15/006,941

(22) Filed: Jan. 26, 2016

(65) Prior Publication Data
US 2017/0212676 A1    Jul. 27, 2017

(51) Int. Cl.
*G06F 3/048*       (2013.01)
*G06F 3/0488*      (2013.01)
*G06K 9/00*        (2006.01)

(52) U.S. Cl.
CPC ..... *G06F 3/04886* (2013.01); *G06K 9/00013* (2013.01); *G06K 9/00087* (2013.01); *G06F 2203/04808* (2013.01)

(58) Field of Classification Search
CPC ........... G06K 9/00013; G06K 9/00087; G06F 3/0481–0489; G06F 3/04886; G06F 2203/04808; G06F 3/017; G06F 21/32; G06F 1/1694; G06F 21/31; G06F 3/016; G06F 1/1616; G06F 1/165; G06F 1/1662; G06F 1/169
See application file for complete search history.

(56) References Cited

U.S. PATENT DOCUMENTS

| | | | | |
|---|---|---|---|---|
| 5,835,079 A | * | 11/1998 | Shieh | G06F 3/0488 345/173 |
| 5,856,824 A | * | 1/1999 | Shieh | G06F 3/0488 345/156 |
| 6,084,576 A | * | 7/2000 | Leu | G06F 3/0219 341/22 |
| 6,898,299 B1 | * | 5/2005 | Brooks | G06K 9/00 340/5.52 |
| 7,277,891 B2 | * | 10/2007 | Howard | G06K 9/00006 707/707 |
| 7,742,626 B2 | * | 6/2010 | Kamata | G06K 9/00362 382/115 |
| 8,027,518 B2 | * | 9/2011 | Baker | G06K 9/00885 340/5.52 |

(Continued)

FOREIGN PATENT DOCUMENTS

WO    WO-2016010524 A1 *  1/2016  ........... G06F 3/0304

OTHER PUBLICATIONS

Himberg, "On-line Personalization of a Touch Screen Based Keyboard", published on Jan. 12, 2003, [online] http://citeseerx.ist.psu.edu/viewdoc/download?doi=10.1.1.88.4784&rep=rep1&type=pdf (Year: 2003).*

*Primary Examiner* — Steven B Theriault
(74) *Attorney, Agent, or Firm* — Ference & Associates LLC

(57) ABSTRACT

One embodiment provides a method including: detecting, using a processor, user input to a surface, the user input being associated with a virtual interface; identifying, within the user input, a palm input pattern; and adjusting the virtual interface based on at least one aspect of the identified palm pattern. Other aspects are described and claimed.

20 Claims, 6 Drawing Sheets

(56) References Cited

U.S. PATENT DOCUMENTS

| | | | | |
|---|---|---|---|---|
| 8,064,645 B1* | 11/2011 | Sezille | G06K 9/00013 | 382/115 |
| 8,345,008 B2* | 1/2013 | Lee | G06F 3/04886 | 345/168 |
| 8,543,833 B2* | 9/2013 | Geiger | G06F 21/32 | 713/186 |
| 8,760,424 B2* | 6/2014 | Laubach | G06F 3/0235 | 345/173 |
| 8,836,643 B2* | 9/2014 | Romera Joliff | G06F 3/016 | 345/168 |
| 9,104,308 B2* | 8/2015 | Au | G06F 3/04883 | |
| 9,203,835 B2* | 12/2015 | Jakobsson | H04L 9/3231 | |
| 9,418,274 B2* | 8/2016 | Aoki | G06K 9/00033 | |
| 9,436,304 B1* | 9/2016 | Leiba | G06F 3/041 | |
| 9,442,575 B1* | 9/2016 | Kandadai | G06F 3/0346 | |
| 9,448,642 B2* | 9/2016 | Law | G06F 3/0216 | |
| 9,448,651 B2* | 9/2016 | Zhai | G06F 3/041 | |
| 9,489,086 B1* | 11/2016 | Marsden | G06F 3/04886 | |
| 9,817,490 B2* | 11/2017 | Zhang | G06F 3/03545 | |
| 9,946,409 B2* | 4/2018 | Ivanov | G06F 3/017 | |
| 10,048,861 B2* | 8/2018 | Bozzini | G06F 3/0219 | |
| 10,102,416 B2* | 10/2018 | Nada | G06K 9/00067 | |
| 10,126,942 B2* | 11/2018 | Marsden | H03K 17/9622 | |
| 2002/0087894 A1* | 7/2002 | Foley | H04L 63/083 | 726/4 |
| 2002/0130844 A1* | 9/2002 | Natoli | G06F 3/014 | 345/168 |
| 2005/0024324 A1* | 2/2005 | Tomasi | G06F 1/1613 | 345/156 |
| 2005/0122313 A1* | 6/2005 | Ashby | G06F 3/0219 | 345/168 |
| 2005/0275637 A1* | 12/2005 | Hinckley | A63F 13/06 | 345/173 |
| 2007/0070051 A1* | 3/2007 | Westerman | G06F 3/0235 | 345/173 |
| 2008/0162649 A1* | 7/2008 | Lee | H04L 51/32 | 709/206 |
| 2008/0226136 A1* | 9/2008 | Takaku | G07C 9/00158 | 382/115 |
| 2008/0266143 A1* | 10/2008 | Ohshita | G06F 3/016 | 341/22 |
| 2009/0085877 A1* | 4/2009 | Chang | G06F 21/36 | 345/173 |
| 2009/0146957 A1* | 6/2009 | Lee | G06F 3/0418 | 345/168 |
| 2009/0237361 A1* | 9/2009 | Mosby | G06F 3/04883 | 345/173 |
| 2009/0243798 A1* | 10/2009 | Fukuda | G06K 9/00375 | 340/5.82 |
| 2010/0117961 A1* | 5/2010 | Westerman | G06F 3/03543 | 345/163 |
| 2010/0127995 A1* | 5/2010 | Rigazio | G06F 3/0418 | 345/173 |
| 2010/0231522 A1* | 9/2010 | Li | G06F 3/0423 | 345/169 |
| 2010/0259561 A1* | 10/2010 | Forutanpour | G06F 3/0216 | 345/660 |
| 2010/0302155 A1* | 12/2010 | Sands | G06F 3/042 | 345/163 |
| 2010/0302165 A1* | 12/2010 | Li | G06F 3/038 | 345/168 |
| 2011/0074692 A1* | 3/2011 | Causey | G06F 3/0216 | 345/169 |
| 2011/0134032 A1* | 6/2011 | Chiu | G06F 3/03547 | 345/157 |
| 2011/0148770 A1* | 6/2011 | Adamson | G06F 3/04883 | 345/173 |
| 2011/0187647 A1* | 8/2011 | Woloszynski | G06F 3/041 | 345/168 |
| 2011/0296333 A1* | 12/2011 | Bateman | G06F 3/04883 | 715/773 |
| 2012/0050187 A1* | 3/2012 | Chen | G06F 3/0418 | 345/173 |
| 2012/0075192 A1* | 3/2012 | Marsden | G06F 3/04886 | 345/168 |
| 2012/0131490 A1* | 5/2012 | Lin | G06F 3/04883 | 715/773 |
| 2012/0133589 A1* | 5/2012 | Marsden | G06F 3/04886 | 345/168 |
| 2012/0146912 A1* | 6/2012 | Chen | G06F 3/0416 | 345/168 |
| 2012/0169611 A1* | 7/2012 | Chen | G06F 3/0418 | 345/173 |
| 2012/0182238 A1* | 7/2012 | Lee | G06F 3/0416 | 345/173 |
| 2012/0182296 A1* | 7/2012 | Han | G06F 3/04883 | 345/419 |
| 2012/0260207 A1* | 10/2012 | Treskunov | G06F 3/04886 | 715/773 |
| 2012/0280916 A1* | 11/2012 | Xia | G06F 3/0334 | 345/173 |
| 2012/0306767 A1* | 12/2012 | Campbell | G06F 3/04883 | 345/173 |
| 2012/0311476 A1* | 12/2012 | Campbell | G06F 3/04886 | 715/773 |
| 2013/0057475 A1* | 3/2013 | Duggan | G06F 3/04886 | 345/168 |
| 2013/0155070 A1* | 6/2013 | Luo | G06T 11/20 | 345/441 |
| 2013/0222247 A1* | 8/2013 | Liu | G06F 3/0418 | 345/168 |
| 2013/0275907 A1* | 10/2013 | Lau | G06F 3/04886 | 715/773 |
| 2013/0283057 A1* | 10/2013 | Hama | G06K 9/00885 | 713/186 |
| 2013/0308834 A1* | 11/2013 | Suzuki | G06K 9/00912 | 382/115 |
| 2014/0168083 A1* | 6/2014 | Ellard | G06F 3/04883 | 345/168 |
| 2014/0337786 A1* | 11/2014 | Luo | G06F 3/041 | 715/773 |
| 2015/0029319 A1* | 1/2015 | Hama | G06K 9/00912 | 348/77 |
| 2015/0116086 A1* | 4/2015 | Kim | G06F 21/32 | 340/5.83 |
| 2015/0242118 A1* | 8/2015 | Zhang | G06F 3/04886 | 715/773 |
| 2015/0269783 A1* | 9/2015 | Yun | G02B 27/0172 | 345/633 |
| 2015/0363038 A1* | 12/2015 | Luo | G06F 3/0488 | 345/173 |
| 2016/0026309 A1* | 1/2016 | Wu | G09G 5/346 | 345/174 |
| 2016/0026329 A1* | 1/2016 | Fadell | G06F 21/316 | 345/173 |
| 2016/0054818 A1* | 2/2016 | Zhang | G06F 3/03545 | 345/173 |
| 2016/0077616 A1* | 3/2016 | Durojaiye | G06F 3/03545 | 345/173 |
| 2016/0085564 A1* | 3/2016 | Arcese | G06F 9/4451 | 726/7 |
| 2016/0098142 A1* | 4/2016 | Winebrand | G06F 3/0416 | 345/174 |
| 2016/0188145 A1* | 6/2016 | Vida | G06F 9/4443 | 715/745 |
| 2016/0328604 A1* | 11/2016 | Bulzacki | G06Q 50/00 | |
| 2017/0003876 A1* | 1/2017 | Marsden | H03K 17/9622 | |
| 2017/0102867 A1* | 4/2017 | Bernard | G06F 3/04883 | |
| 2017/0185287 A1* | 6/2017 | Unruh | G06F 3/04886 | |
| 2018/0032146 A1* | 2/2018 | Yun | G06F 3/0426 | |
| 2018/0032245 A1* | 2/2018 | Wu | G06F 3/0416 | |

* cited by examiner

VIRTUAL INTERFACE OFFSET

BACKGROUND

Devices, e.g., tablets, smart phones, laptops having a touch screen, etc., are increasingly being used as a replacement for a full computer. Because of the increased processing power available to these mobile devices, they are more capable than ever before. It is because of this increased capability that they have become so popular as an alternative to a typical computer or laptop.

However, some aspects of these devices are still lacking compared to their older less portable counterparts. For example, touch as a method of input, one of the most useful features, can sometimes be a hindrance of a mobile device. Specifically, it can be difficult to enter large amounts of information on a touch surface, compared to a more tactile system (e.g., physical keyboard and mouse). This difficulty exists for many reasons, for example the lack of tactile feedback, size constraints, etc. Without tactile feedback, it can be difficult for a user to determine if they are pressing an input key, and if that input key is the desired key. This lack of responsive feedback can lead to a user shifting their fingers to an incorrect location during use, thus resulting in improper input to a device.

BRIEF SUMMARY

In summary, one aspect provides a method, comprising: detecting, using a processor, user input to a surface, the user input being associated with a virtual interface; identifying, within the user input, a palm input pattern; and adjusting the virtual interface based on at least one aspect of the identified palm pattern.

Another aspect provides an information handling device, comprising: a processor; a memory device that stores instructions executable by the processor to: detect user input to a surface, the user input being associated with a virtual interface; identify, within the user input, a palm input pattern; adjust the virtual interface based on at least one aspect of the identified palm pattern.

A further aspect provides a product, comprising: a storage device having code stored therewith, the code being executable by a processor and comprising: code that detects user input to a surface, the user input being associated with a virtual interface; code that identifies, within the user input, a palm input pattern; code that adjusts the virtual interface based on at least one aspect of the identified palm pattern.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
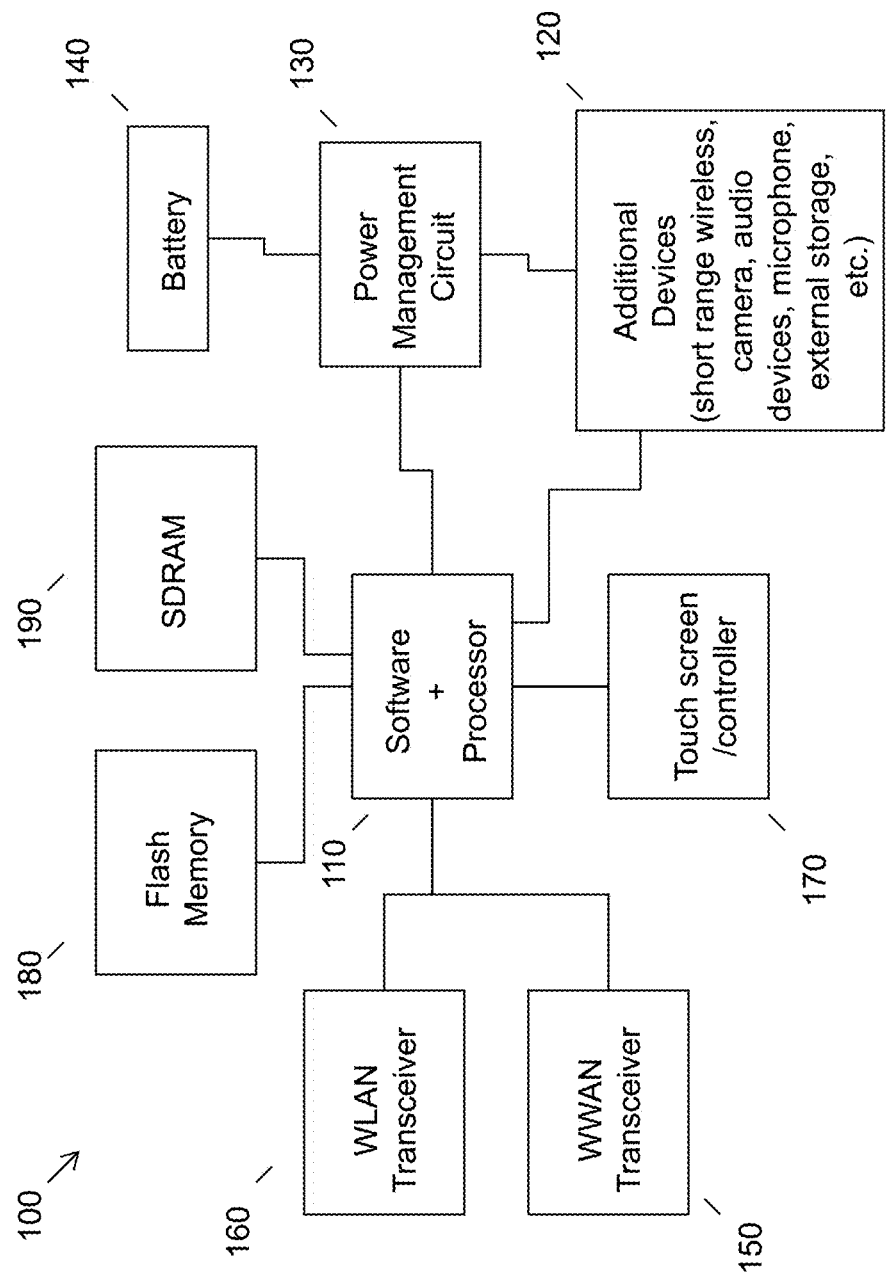
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As discussed herein, touch devices and/or touch interfaces have many advantages, but also many disadvantages. For example, currently, typing or interfacing with virtual buttons (e.g., an onscreen/virtual keyboard, virtual mouse, virtual application, etc.) on a screen or flat surface lacks tactile feedback. Tactile feedback is typically helpful as it provides information to a user regarding their desired input, such as the click sound when pressing a key on a keyboard. Additionally, it can help a user gauge if their input position is off or a skew. For example, if a user where typing using a typical physical keyboard (e.g., mechanical, rubber dome, etc.) they would be able to identify a change in feel if their fingers had drifted slightly off skew from the keyboard.

Thus, flat touch surfaces (e.g., a touch display, touch surface, projection surface, etc.) are more prone to position drifting and erroneous input by a user. Currently, the most common solution, in order to ensure proper entry on a touch surface, is a user to look at their fingers and the virtual interface (e.g., on-screen keyboard) as they type, readjusting their position as necessary. However, this solution is cumbersome and may detract the user from content they are interacting with. This method also makes it very difficult to type one document while reading another.

Alternatively, a current software solution that requires the user to place their fingers onto the touch screen for tracking exists. Once the fingers are detected, the home keys may be relocated underneath each respective finger. However, this solution is still inefficient as it requires a user contact the screen with eight fingers, and the user must keep those fingers in contact with the virtual keyboard, which can be uncomfortable and lead to hand fatigue.

The above technical issues present problems for a user when they are attempting to use their touch device (e.g., mobile device) to enter long or detailed information, such as composing an email, writing a document, etc. Generally, when a user is typing for an extended period of time (e.g., more than one minute), they will rest the base of their palms on an adjacent surface (e.g., a keyboard wrist rest, desk, laptop base, etc.). Thus, a solution that utilizes this additional data (i.e., wrist contact location) creates a much more convenient solution to the technical problem of typing on a touch surface.

Without tactile cues for alignment, a user may move their hands during prolonged use, or position their hands in subtly different locations upon subsequent uses of the virtual interface (e.g., virtual keyboard). Accordingly, an embodiment provides a method of receiving, at a touch surface device one or more palm contacts. Analyzing the palm contact signatures and their relationship to finger contact points associated with the graphical user interface (GUI) and compensating for potential finger drift.

Another embodiment provides a new data set to improve the accuracy and immediacy of prediction used for adjusting the touch zones associated to any virtual interface or GUI in which the user rests their palms on a touch sensitive surface. Thus, because an embodiment uses palm data it also has the potential to adjust any input zones prior to the user touching the surface (e.g., touch screen) with their fingers. Thus, this technical improvement allows for adjustment to occur faster, be more dynamically accurate and occur with less abruptly.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, an audio capture device such as a microphone, etc. System 100 often includes a touch screen 170 for data input and display/rendering. Additionally, a touch controller may be used, which receives touch input (e.g., a track/touch pad). System 100 also typically includes various memory devices, for example flash memory 180 and SDRAM 190.

Figure 2:
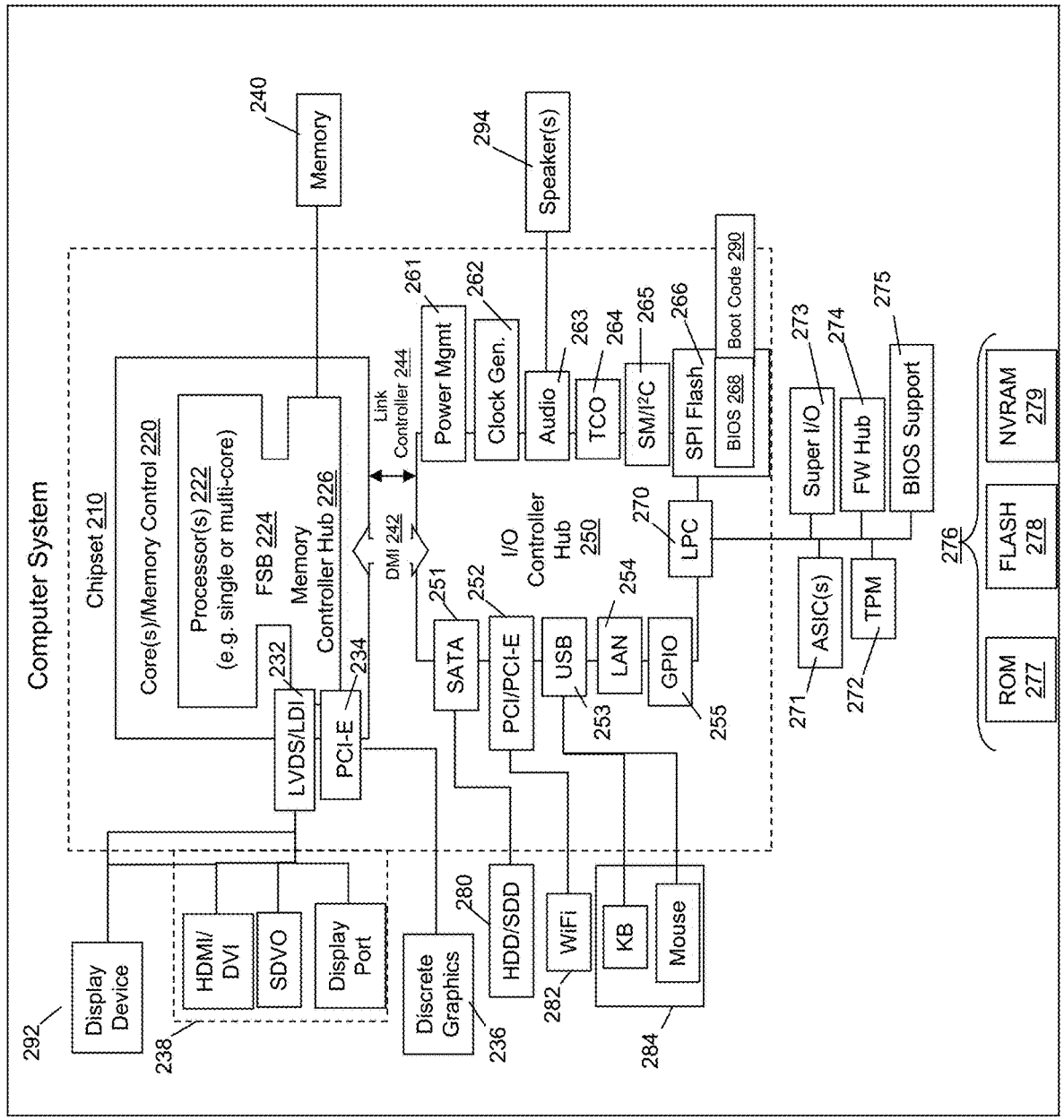
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, personal computer devices generally, and/or electronic devices which users may use to enter data, such as through the use of a virtual interface, such as an on-screen keyboard. For example, the circuitry outlined in FIG. 1 may be implemented in a tablet or smart phone embodiment, whereas the circuitry outlined in FIG. 2 may be implemented in a personal computer embodiment.

Figure 3:
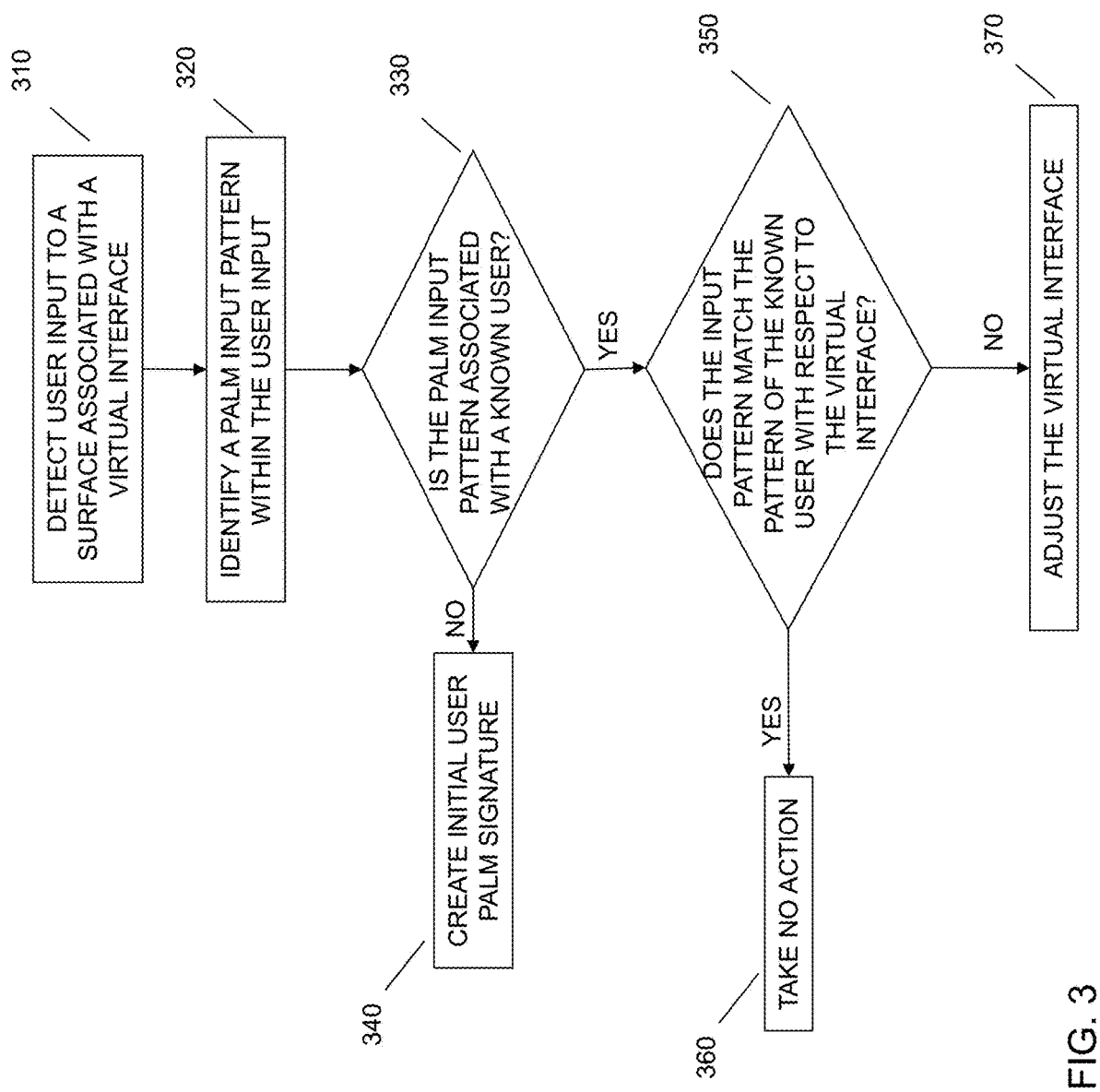
FIG. 3 illustrates an example method of virtual interface offset.
Figure 4:
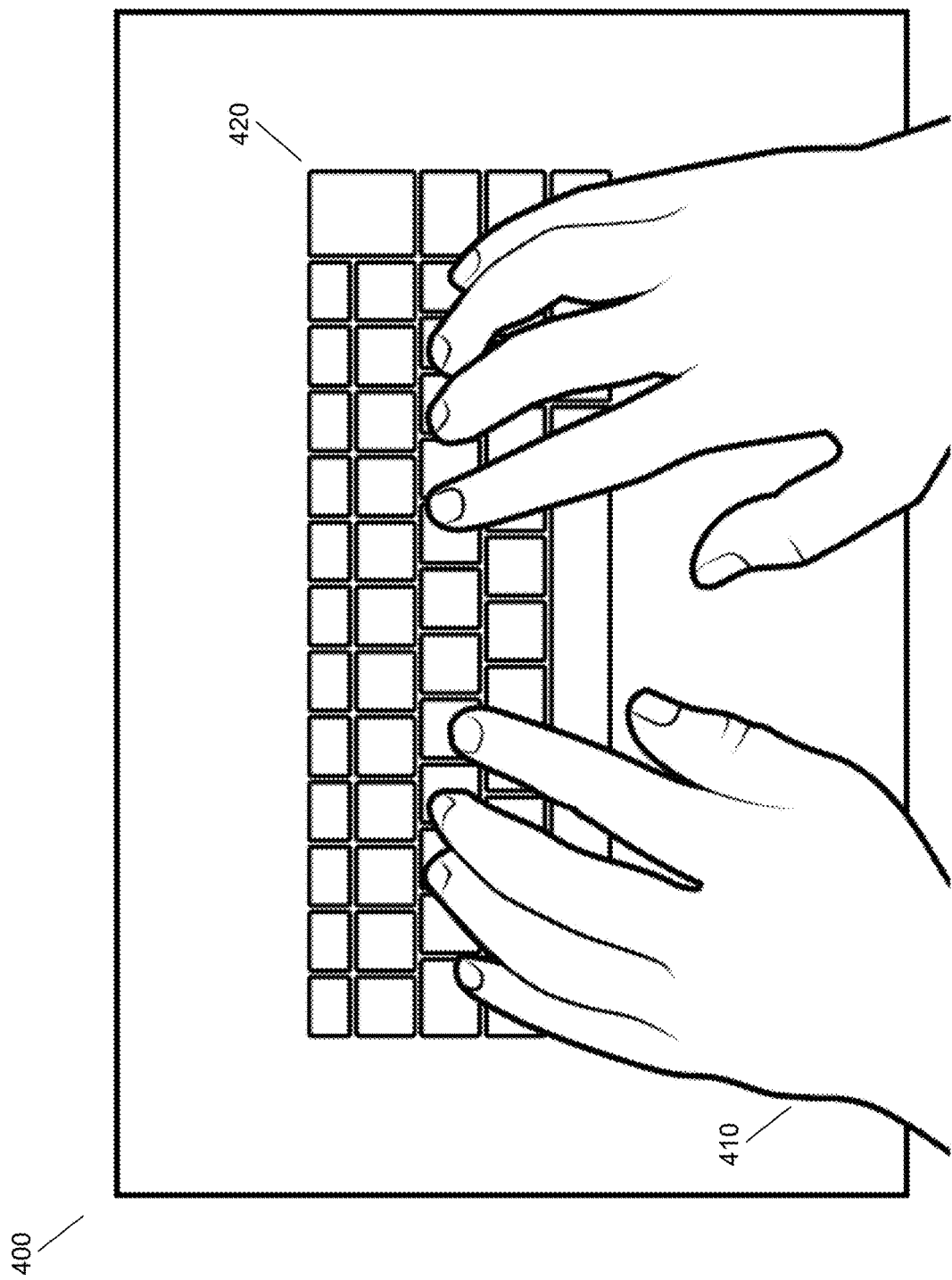
FIG. 4 illustrates an example virtual keyboard and palm input.

Referring now to FIG. 3, an embodiment may detect user input to an input surface device (e.g., a touch screen, touch pad, track pad, projection surface, etc.) associated with a virtual interface at 310. The user input may include for example a user's finger tips, a user's resting palms, etc. Referring briefly to FIG. 4, an example embodiment is shown that may detect the palm of a user at 410. As shown in FIG. 4, the touch surface 400 may be a touch display, which has a GUI displaying a virtual interface (e.g., onscreen or projection keyboard) at 420.

Referring back to FIG. 3, once the user input is detected at 310, an embodiment may identify a palm input pattern within the user input at 320. As discussed further herein, the identified palm input may be from a single palm or two palms. Based on the specific pattern detected relating to the palm input, an embodiment may then determine if the palm input pattern is associated with a known user. An embodiment may make this determination based on a user profile. The user profile may comprise a palm signature (i.e., a palm signature based on how a user's rested palms are typically detected).

In a further embodiment, the palm signature associated with the user profile may be created based on historical user input. For example, an embodiment may detect a new user's palm(s) resting on the touch surface. The new user's detected palm signature may be stored and compared against future palm detections. Over time, an embodiment can compare subsequent palm input patterns and improve the accuracy of the user's palm signature.

Additionally or alternatively, a palm signature creation wizard may be activated by a user. During this process, an embodiment may request the user place their palm(s) on the touch surface in a natural and comfortable manner. An embodiment may also request additional user information (e.g., physical characteristics of the user's hands or palms). Based on this process, an embodiment may generate a high quality signature which allows for improved future matching accuracy. In addition, an embodiment may still improve or build upon the user's palm signature during future uses. This allows for potential changes in the user's hands (e.g., weight gain or loss, injury, etc.) without affecting detection accuracy.

Figure 5:
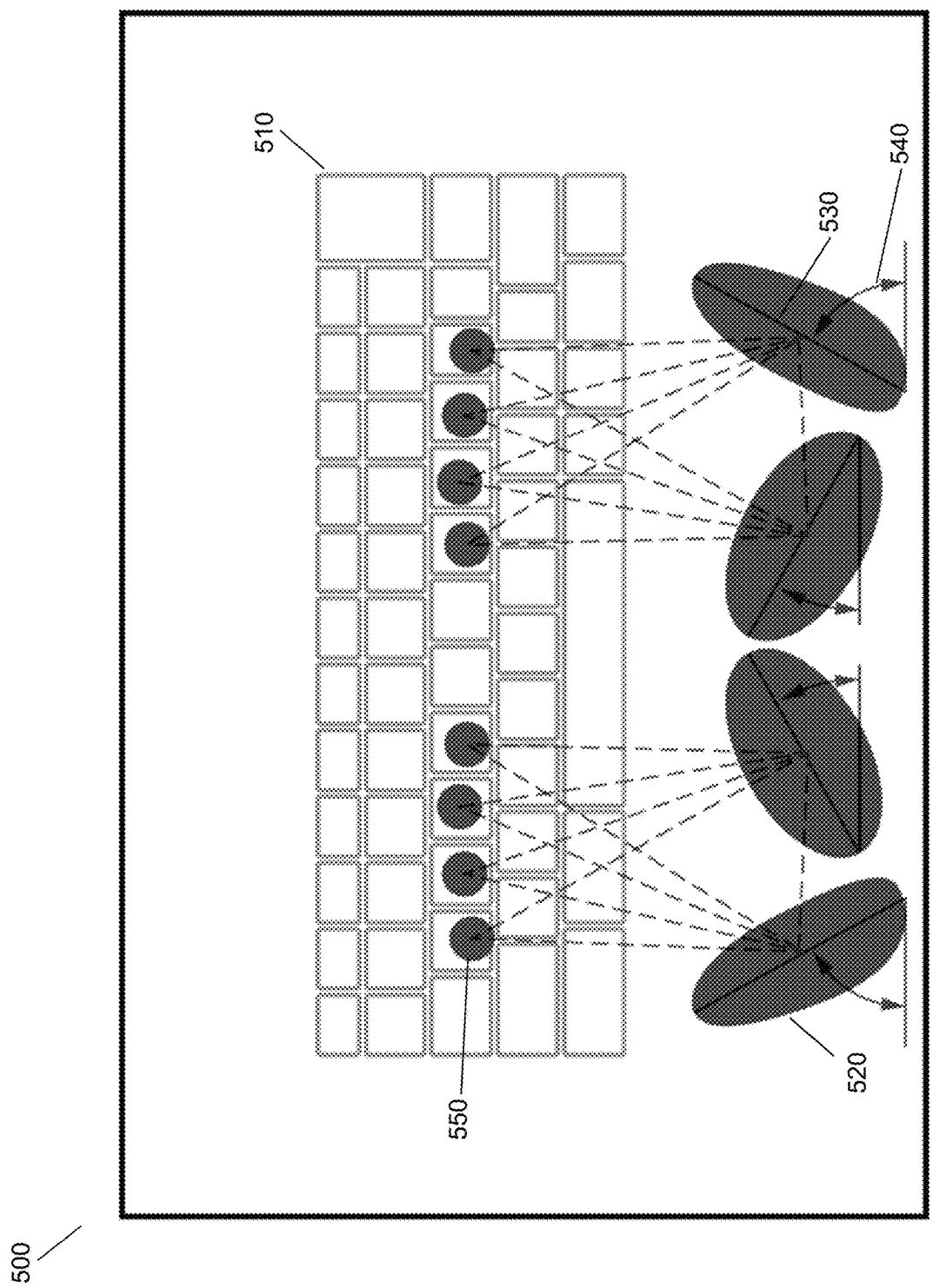
FIG. 5 illustrates an example of finger contact and palm signature contact.

Referring briefly to FIG. 5, similar to FIG. 4, the example display at 500 shows a GUI consisting of a virtual (e.g., onscreen or projected) keyboard at 510. As discussed herein, an embodiment may detect a user's palms resting on the touch surface at 520. In one embodiment, a center line location 530 is determined for each point of palm contact. Additionally, an embodiment may calculate an angle difference from normal of the palm center line at 540. As shown in FIG. 5, this determination and calculation may be carried out for each point of contact made by a user's palm(s).

In a further embodiment, the characteristics of each palm point of contact 520 (e.g., the center line and angle) may be associated with one or more finger locations relative to the onscreen keyboard at 550. Thus, as discussed herein, a palm signature, such as that shown in FIG. 5, corresponds to one or more finger locations at 550, which allows an embodiment to anticipate the location of the keys (e.g., home keys) of the software keyboard.

Referring again to FIG. 3, once a palm input pattern had been identified at 320, and embodiment may determine if the palm input pattern is associated with a known user at 330. This determination is based on the known palm signatures associated with specific user profiles, as discussed herein. Thus, if an embodiment determines that the current palm input pattern is not associated with a known user (e.g., a new user is attempting input) an initial user palm signature may be created at 340. As discussed herein, the user's palm signature may be continuously updated at subsequent input intervals, thus creating a historical representation of a user's palm signature.

Alternatively, if the current palm input is determined to be associated with a known user at 330, an embodiment may then determine if the current pattern matches the known pattern (e.g., palm signature) with respect to the virtual interface (e.g., virtual keyboard) at 350. For example, determining if the palm contact points (e.g., 520 of FIG. 5) are angled or misaligned in an unexpected manner with respect to the virtual keyboard. If at 350 an embodiment determines that the angle or alignment with respect to the interface matches the stored signature, no action is taken at 360.

Figure 6:
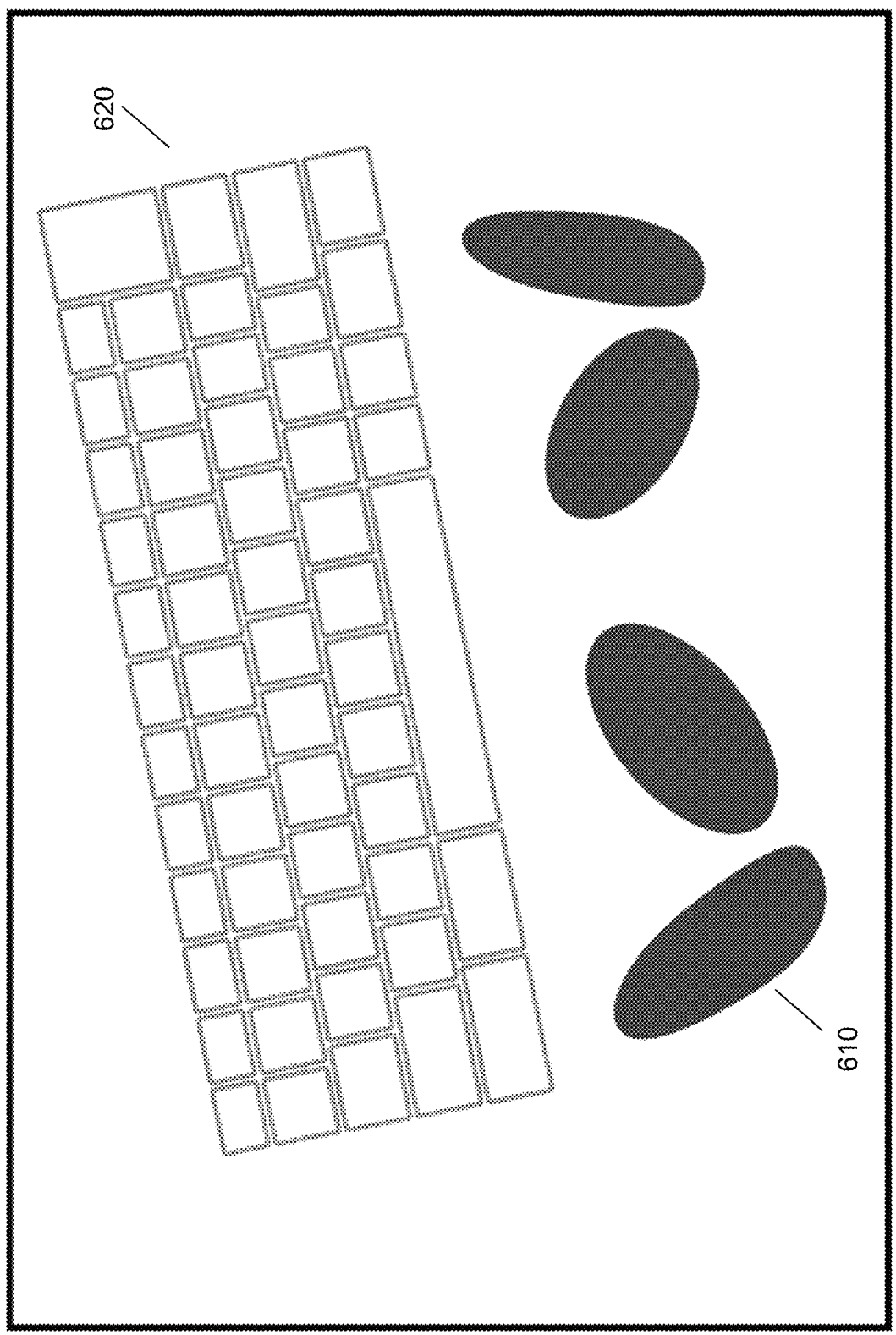
FIG. 6 illustrates an example of virtual keyboard offset based on palm input pattern.

However, if an embodiment determines at 350 that the current input pattern does not match the known user's at 350, an embodiment may adjust the virtual interface at 370. The virtual interface may be adjusted in a variety of ways. For example, an embodiment may adjust the GUI display of the virtual interface, such as that shown in FIG. 6. As shown in FIG. 6 the detected palm input pattern 610 is skewed from that shown in FIG. 5. Thus, an embodiment may determine that the associated finger positions are skewed by a similar angle and adjust the virtual keyboard 620 to account for the misalignment (e.g., adjusting the overall orientation of the display location of the virtual keyboard).

Alternatively, an embodiment may only adjust the input locations of the virtual keyboard while allowing the GUI display to remain fixed. Thus, although the image of a particular key or keys (e.g., the home keys) is fixed, the touch locations (i.e., the location where a user must make contact to register a specific input) may be adjusted. This would allow a user to continue typing or entering information regardless of how the virtual keyboard is displayed. Similar to the above example, the adjustment may comprise adjusting the orientation of the one or more input locations associated with the virtual keyboard.

In one embodiment, the detected palm input pattern, may only correspond to a single palm. For example if a user only uses their right hand to interact with the virtual keyboard. Thus, an embodiment may determine based on only a single palm input pattern that the virtual keyboard requires adjustment, (e.g., an adjustment as discussed herein). In a further embodiment, a portion of the virtual keyboard may be treated independently of the whole. For example, if a user only rests their right palm on the touch surface, an embodiment may only adjust the right hand portion of the virtual keyboard.

Additionally or alternatively, a user may rest both palms on the touch surface; however, an embodiment may still adjust portions of the virtual keyboard independently. For example, a left palm signature may be associated with a left portion of the virtual keyboard (e.g., the key column containing 5, t, g, b and all keys to the left) and a right palm signature may be associated with a right portion of the virtual keyboard (e.g., the key column containing 6, y, h, n, and all the keys to the right). Thus, an embodiment may adjust the left and right portions of the virtual keyboard according to their respective palm pattern, thereby creating a split or ergonomic keyboard.

Accordingly, as illustrated by the example embodiments and figures, an embodiment provides a method for detecting user input to a surface device. Identifying a palm pattern within the user input. Determining if that palm pattern matches any known user profiles, and if so checking to determine if the palm pattern is at the correct or expected orientation with respect to the virtual keyboard. If it is determined that the palm input pattern is skewed, an embodiment may adjust the virtual keyboard (e.g., change the orientation) in order to accommodate the skewing of the user's palms and by association a user's fingers.

The various embodiments described herein thus represent a technical improvement to accepting user input on a touch surface, by creating a palm signature associated with a specific user. The palm signature is also associated with one or more anticipated finger locations with respect to the virtual keyboard. An embodiment may, based on the signature, evaluate current palm input and determine if the virtual keyboard should be adjusted to allow for more accurate user entry.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   detecting, at a display surface of an information handling device, user palm input, wherein the user palm input comprises a left palm signature associated with a left portion of a virtual keyboard and a right palm signature associated with a right portion of the virtual keyboard;
   identifying, based on a characteristic of the user palm input, a palm input pattern;
   determining whether the palm input pattern is associated with a known user;
   identifying, responsive to determining that the palm input pattern is associated with the known user, a default display location of the virtual keyboard;
   displaying, at the default display location, the virtual keyboard;
   detecting a change in orientation of either the left palm signature or the right palm signature; and
   adjusting, responsive to the detection, at least one of: the left portion based on a detected change in orientation of the left palm signature and the right portion based on a detected change in orientation of the right palm signature.

2. The method of claim 1, further comprising:
comparing, with respect to the virtual interface, the identified palm input pattern with a known palm input pattern.

3. The method of claim 2, wherein the comparing is responsive to determining, using a processor, that the palm input pattern is associated with a specific user; and
wherein the known palm input pattern is a palm pattern template for the specific user.

4. The method of claim 1, wherein the adjusting comprises adjusting a display location of the virtual interface.

5. The method of claim 4, wherein the adjusting further comprises adjusting an orientation of the display location of the virtual interface.

6. The method of claim 1, wherein the virtual interface comprises a virtual keyboard; and
wherein the adjusting comprises, adjusting one or more input locations associated with the virtual keyboard.

7. The method of claim 6, wherein the adjusting further comprises, adjusting an orientation of the one or more input locations associated with the virtual keyboard.

8. The method of claim 1, further comprising, creating, based on historical user input, a user profile.

9. The method of claim 8, wherein the user profile comprises, a palm signature; and
wherein the palm signature corresponds to at least one finger location.

10. The method of claim 1, wherein the surface is an input surface selected from the group consisting of: a touch display, a touch surface, and a projected surface.

11. An information handling device, comprising:
a display surface
a processor;
a memory device that stores instructions executable by the processor to:
detect user palm input, wherein the user palm input comprises a left palm signature associated with a left portion of a virtual keyboard and a right palm signature associated with a right portion of the virtual keyboard;
identify, based on a characteristic of the user palm input at least one palm point of contact, a palm input pattern;
determine whether the palm input pattern is associated with a known user;
identify, responsive to determining that the palm input pattern is associated with the known user, a default display location of the virtual keyboard;
display, at the default display location, the virtual keyboard;
detect a change in orientation of either the left palm signature or the right palm signature;
and
adjust, responsive to the detection, at least one of: the left portion based on a detected change in orientation of the left palm signature and the right portion based on a detected change in orientation of the right palm signature.

12. The information handling device of claim 11, wherein the instructions are further executable by the processor to:
compare, with respect to the virtual interface, the identified palm input pattern with a known palm input pattern.

13. The information handling device of claim 12, wherein the instructions executable by the processor to compare is responsive to a determination that the palm input pattern is associated with a specific user; and
wherein the known palm input pattern is a palm pattern template for the specific user.

14. The information handling device of claim 11, wherein the instructions executable by the processor to adjust, adjusts a display location of the virtual interface.

15. The information handling device of claim 14, wherein the instructions executable by the processor to adjust, further adjusts an orientation of the display location of the virtual keyboard.

16. The information handling device of claim 11, wherein the virtual interface comprises a virtual keyboard; and
wherein the instructions executable by the processor to adjust, adjust one or more input locations associated with the virtual keyboard.

17. The information handling device of claim 16, wherein the instructions executable by the processor to adjust, further adjusts an orientation of the one or more input locations associated with the virtual keyboard.

18. The information handling device of claim 11, wherein instructions are further executable by the processor to create, based on historical user input, a user profile.

19. The information handling device of claim 18, wherein the user profile comprises, a palm signature; and
wherein the palm signature corresponds to at least one finger location.

20. A product, comprising:
a non-transitory storage device that stores code, the code being executable by a processor and comprising:
code that detects user palm input to a display surface, wherein the user palm input comprises a left palm signature associated with a left portion of a virtual keyboard and a right palm signature associated with a right portion of the virtual keyboard;
code that identifies, based on a characteristic of the user palm input, a palm input pattern;
code that determines whether the palm input pattern is associated with a known user;
code that identifies, responsive to determining that the palm input pattern is associated with the known user, a default display location of the virtual keyboard;
code that displays, at the default display location, the virtual keyboard;
code that detects a change in orientation of either the left palm signature or the right palm signature;
and
code that adjusts, responsive to the detection, at least one of: the left portion based on a detected change in orientation of the left palm signature and the right portion based on a detected change in orientation of the right palm signature.

* * * * *